Feb. 25, 1958 H. RHODES 2,824,375
ATTACHMENT FOR "CENTER-MIKE" VERNIER CALIPERS
Filed July 15, 1954
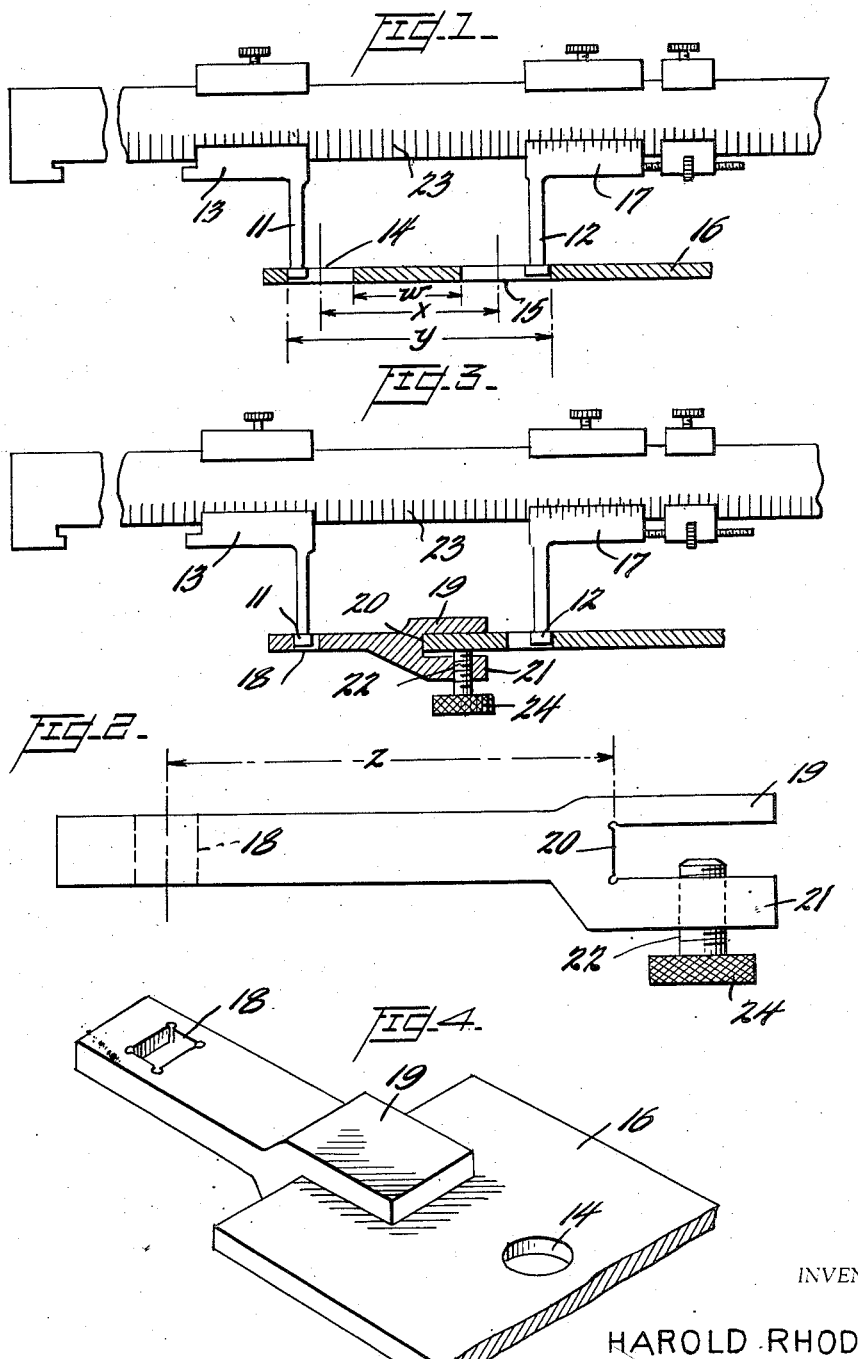
INVENTOR
HAROLD RHODES
BY
ATTORNEY United States Patent Office 2,824,375
Patented Feb. 25, 1958

2,824,375

ATTACHMENT FOR "CENTER-MIKE" VERNIER CALIPERS

Harold Rhodes, Graham, N. C., assignor to Western Electric Company, Incorporated, New York, N. Y., a corporation of New York Application July 15, 1954, Serial No. 443,625

4 Claims. (Cl. 33—143)

This invention pertains to an apparatus for measuring, and more particularly for measuring the distance from the center of an aperture in a plate to the edge of the plate.

In the past the problem of accurately measuring the distance from the center line of an aperture to the edge of a plate has been very difficult. To measure the aforementioned distance at all has been a relatively complicated and tedious operation and the result was at best an approximation gained by measuring the distance from the side of the aperture to the side of the plate and then determining the diameter of the aperture with some inside measuring instrument, dividing the diameter of the aperture by two in order to get the radius and then adding the radius to the measurement obtained from the side of the aperture to the edge of the plate. It can be readily seen that this is a time-consuming and not particularly accurate method to obtain such a measurement, particularly where close tolerances must be held, as with so many operations it is obviously subject to a number of errors in measurement or in mathematics before the desired result is obtained.

It is one object of this invention to provide a simplified means for measuring the distance from the center line of an aperture in a plate to the edge of the plate.

It is a further object of this invention to enable an operator to make the measurement with the use of only one measuring instrument.

It is a still further object of this invention to provide means for making the measurement without any complicated addition or subtraction on the part of the operator.

Yet another object of the invention is to provide an adapter which when used in conjunction with a center micrometer of the Sorensen type enables the operator to make the measurements directly.

Other objects and advantages of the invention will become apparent from the following detailed description when taken in conjunction with the following drawings, wherein:

Fig. 1 is a "center-mike" caliper of the Sorensen type shown as it is used to measure the distance between center lines of apertures in a plate;

Fig. 2 illustrates a side view of an adapter as contemplated by the invention;

Fig. 3 illustrates a sectional view of the plate and adapter as used with the "center-mike" caliper in accordance with the instant invention to measure the distance from the center line of an aperture to the edge of a plate; and Fig. 4 illustrates a perspective view of the plate and adapter attached in preparation for making the measurement.

Referring now to the drawings wherein the like references refer to like elements in the several views, Fig. 1 demonstrates the use of "center-mike" calipers which is old in the art. The "center-mike" caliper operates by first positioning left-hand measuring block 13 and prong 11 at the zero position on scale 23 and inserting prong 11 into aperture 14 in plate 16 and slidably adjusting measuring block 17 and prong 12 so that prong 12 can be inserted into aperture 15, whereby the prongs are at such a distance apart as to be in firm contact with the inner or near edges of the apertures 14 and 15. Block 17 is fixed in this position by tightening the set screw. Block 17 is now a distance $w$ from zero and from block 13. When the position has been thus fixed the prongs are removed from the apertures and the block 13 is moved up to abut the block 17. Block 13 is fixed in this position by means of its set screw and the block 17 is loosened and prongs 11 and 12 are inserted in the apertures 14 and 15 and positioned as to make firm contact with the outer or remote sides of the apertures as shown in Fig. 1. Block 17 is now a distance from block 13 equal to $y$ minus the sum of the widths of the contact tips on prongs 11 and 12. The caliper is so constructed as to add the distances $w$ and $y$ and divide the sum by two, so that the reading is, in effect, an average distance between the pairs of surfaces which is the distance between the center lines of the apertures. Mathematically expressed this will be $$\frac{y+w}{2}=x$$

where the letters correspond to the dimensions so designated in Fig. 1, with $x$ being the unknown dimension between aperture center lines.

Referring now to Fig. 2, I show my adapter, which has a rectangular aperture 18 near one extremity and is bifurcated at the other extremity, having an upper member 19, an abutting or positioning face 20 and a lower member 21 with a set screw 22 having a knurled knob 24 threaded therethrough to fixedly attach the adapter to the plate on which the measurement is to be made. My adapter is so constructed that the axial center line of the aperture 18 is a known distance $z$ from the abutment or face 20 of the bifurcated portion. This distance $z$ is preferably a small, whole number such as "one" so that it can be readily and simply subtracted mentally to complete the measurement as will be hereinafter pointed out.

To measure the distance from the center line of an aperture to the edge of a plate using a "center-mike" caliper, the adapter is positioned as an extension to the line to be measured, so that the plate lies between the upper member 19 and the lower member 21 with its edge firmly abutting the abutment 20 of the adapter. The adapter is fixed in this position by tightening the set screw 22 so as to press the plate and the upper member 19 firmly together and thereby fix the adapter in the above-described position, as shown in Fig. 3. The operator then measures the distance between the center line of the aperture 18 in the adapter and the center line of the aperture in the plate in two operations, as described above for measuring the center line distance between apertures. The "center-mike" caliper will be read directly to give the center line distance between aperture 18 in the adapter and the aperture 14 in the plate. The operator then subtracts the simple dimension $z$ and obtains the exact distance from the center line of the aperture in the plate to the edge of the plate.

While the features of this invention have been disclosed in a specific embodiment, it is, of course, understood that various modifications may be made in the specification without departing from the scope of this invention.

What is claimed is:

1. An apparatus for measuring the distance between the center line of an aperture in a plate and an edge of the plate comprising an adapter detachably mountable on said plate, said adapter having a positioning surface for the edge of said plate and an aperture the center line of which is a known distance from said positioning surface, and means for measuring the distance between the center lines of said apertures.

2. In combination with a "center-mike" caliper an adapter for measuring the distance from the edge of a plate to the center line of an aperture therein, said adapter comprising a plate with a positioning surface and an aperture a known distance from said positioning surface.

3. Apparatus for measuring the distance from the edge of a plate to the center line of an aperture therein comprising an adapter detachably mountable on said plate, said adapter having two parallel members connected by a positioning surface and an aperture a known distance from said positioning surface, means for fixedly attaching said adapter to said plate to be measured, and means for measuring the center line distance between said two apertures.

4. Apparatus for measuring the distance from the center line of an aperture in a plate to the edge of the plate comprising a one-half scale linear measuring device, two measuring prongs, means for fixing said measuring prongs at desired positions on the linear measuring device, and an adapter comprising a plate with an edge positioning abutment, an aperture having its vertical center line a known distance from said abutment, and means for fixedly positioning said adapter along the line to be measured.

References Cited in the file of this patent
UNITED STATES PATENTS

| | | |
|---|---|---|
| Re. 24,224 | Sorensen | Sept. 25, 1956 |
| 2,388,582 | Sorensen | Nov. 6, 1945 |
| 2,692,438 | Schneider | Oct. 26, 1954 |
| 2,693,033 | Acker et al. | Nov. 2, 1954 |
| 2,700,825 | Sorensen | Feb. 1, 1955 |
| 2,727,313 | Wonders | Dec. 20, 1955 |
| 2,774,145 | Sorensen | Dec. 18, 1956 |

OTHER REFERENCES

Publication: Popular Science, page 176, July 1945.